United States Patent Office 3,216,952
Patented Nov. 9, 1965

3,216,952
SUPPORTED NICKEL CATALYST AND
PREPARATION THEREOF
Claude Auguste Louis Paul, Samuel Pupko, Louis Marcel Grandet, and Jacques Bertrand Sarlabous, all of Toulouse, Haute-Garonne, France, assignors to Office National Industriel de l'Azote
No Drawing. Filed Dec. 13, 1961, Ser. No. 159,173
Claims priority, application France, Dec. 19, 1960, 4,686
2 Claims. (Cl. 252—455)

This invention relates to a process for producing improved catalyst base materials and to catalysts incorporating said base materials.

The progressive reduction in the activity of catalysts for converting gaseous or liquid hydrocarbons, especially while they are being used for certain processes, is a recurrent problem for which no effective remedy has been put forward.

As a result of recent research work, this diminution in activity has been attributed to progressive formation of catalytically inactive chemical compounds by reaction, in the solid phase, of the alumina base (support) and the metals and metal oxides of the eighth group of the periodic classification of the elements which generally form part of the composition of the catalysts. These compounds may easily be detected by their characteristic lines given by the aluminates of these metals on diffraction diagrams of inactive catalysts examined under X-rays.

It has been established that the speed of inactivation depends basically on the conditions under which the conversion process is operated.

In continuous processes of converting hydrocarbons by water vapor, where the heat necessary for transformation is provided in the reaction zone through the walls, the reduction in the activity of the catalysts is extremely slow, the catalysts being permanently in contact with a reducing atmosphere. Practically the same applies to the contact materials used in continuous processes (auto-thermic) for converting hydrocarbons by oxygen derived from air (atmospheric oxygen).

On the other hand, cyclic processes for converting liquid or gaseous hydrocarbons by means of water vapor make use of the successive heating of the active material in each cycle, by oxidizing gases in one phase, and conversion in a reducing atmosphere in another, which subjects the catalysts to very rigorous treatment. It has been found that repetitive oxidation and reduction is particularly conducive to lowering the activity of the catalysts, and that their progressive inactivity increases with the rise in temperature concerned.

It is a main object of the present invention to slow down to a large degree, or totally to avoid, as the case may be, the reduction in activity of the catalysts in the course of use.

According to the invention there is provided a process for producing catalyst base materials having a decreased tendency to combine with an active catalytic material carried thereby, said process comprising reacting wholly or partly the alumina of a base material or support comprising such compounds with one or more oxides of metals of a group of the periodic table other than the eighth group, and preferably selected from the second group, as calcium, strontium and/or barium, the reaction being effected in the solid state. The quantity of this oxide may exceed the stoichiometric quantity in relation to the alumina present in the support without any harmful influence on the activity of the catalyst obtained from subsequent incorporation into the support of an active metal or oxide of a metal selected from the eighth group of the period classification.

The contact materials obtained according to the process of the invention display extended activity under normal conditions, depending on the amount of alumina combined with the group II metallic oxide.

This activity may become indefinitely prolonged if the whole of the alumina is transformed into aluminate. After more than a year of use X-ray examination of catalysts the alumina support of which has been previously combined in its entirety with a group II metal fails to disclose the formation of aluminate of the active metal.

The two examples which follow are given purely by way of example and do not constitute a limitation of the invention. Their purpose is to reveal the influence of the proportion of alumina of the base combined in the form of aluminate on the active life of the catalysts. Percentages are by weight.

Example 1

A silico-aluminous product containing 41.5% of silica and 58.5% of alumina, is used for preparing four different supports containing respectively 9.1, 16.7, 30.0 and 50% calcium oxide. These supports are obtained by mixing the aluminous product and the calcium oxide in the presence of a suitable volume of water in a mixer, extruding, drying and calcining at about 950° C.

The granules of the catalyst base or support thereby obtained are dipped in an aqueous solution of nickel nitrate, dried in the open then in the furnace, and calcined at about 500° C. to transform the nitrate into nickel oxide.

The titre of reducible nickel in these catalysts (also called "active" nickel) varies between 5.45 and 5.87%.

These various catalysts are used in identical conditions in parallel with a "control" catalyst, for cyclic conversion of natural gas by means of water vapor at 800° C. Each cycle comprises a phase in which the contact material is heated by a fuel gas containing excess air, and a conversion phase, these successive phases being separated by purges of water vapor.

A gaseous mixture, the average composition of which is given in the table below, is obtained from a molar ratio $H_2O/CH_4$ of I.56, with an overall yield of 85% in proportion to the starting methane:

|  | Percent |
|---|---|
| $CO_2$ | 5.8 |
| $H_2$ | 64.7 |
| $CO$ | 19.8 |
| $CH_4$ | 4.6 |
| $N_2$ | 5.1 |

The results obtained with "control" catalysts, the base or support of which had not been treated in accordance with the process of the invention, and with the four catalysts described, are given below.

The activity of the catalysts was determined at the end of a variable period of use, by the content of "active" residual nickel, calculated as a percentage of the original content:

| Number of the Catalyst | Composition by weight of the base | | Alumina combined with calcium oxide (percent) | Initial "active" nickel (percent) | Duration of the run in hours | Percentage of "active" residue at end of run |
| | Basic silico aluminous product (percent) | Calcium oxide (percent) | | | | |
|---|---|---|---|---|---|---|
| Control | 100.0 | 0 | 0 | 5.80 | 1,460 | 45.2 |
| 1 | 90.9 | 9.1 | 17.2 | 5.45 | 1,460 | 58.5 |
| 2 | 83.3 | 16.7 | 47.0 | 5.60 | 1,460 | 78.6 |
| 3 | 70.0 | 30.0 | 100.0 | 5.87 | 9,000 | 97.0 |
| 4 | 50.0 | 50.0 | 100.0 | 5.50 | 9,000 | 97.2 |

In catalysts 1 and 2, in which the alumina support was only partly combined with the calcium oxide, it will be observed that there is a clear improvement in activity over that of the "control" catalyst.

The activity remains almost constant for catalysts 3 and 4 in which the whole of the alumina is combined with the lime and the residual methane content of the gas produced does not vary in the course of the runs, whereas this is not so with the "control" catalyst and catalysts 1 and 2.

Catalyst 4 contains an excess of lime in relation to the stoichiometric quantity, which is 30% $Ca(OH)_2$ for 70% of the silico-aluminous product. This excess is in no way detrimental to the activity of the contact material.

*Example 2*

White bauxite is used as starting product for the base, this being a natural mineral formed basically of alumina. This product, to which a suitable amount of calcium oxide is added, is crushed and then submitted to heat treatment at 1200–1400° C. in a rotating furnace. The nodules or clinkers thus formed are sorted in a rotary sieve and arranged according to their granulations, the dross being usefully employed as cement after crushing and sifting. The mean balanced composition of these nodules in which the whole of the alumina is combined with calcium oxide is 0.9% $SiO_2$, 63.1% $Al_2O_3$ and 36.1% CaO.

These nodules, treated as supports as in Example 1, produce a catalyst which contains 5.9% reducible nickel, used for converting natural gas by water vapor in conditions identical to those described in Example 1. Its activity is practically invariable, and its content in "active" nickel after a year of uninterrupted functioning is 98% of the original reducible nickel.

The calcium oxide in the preceding examples can be replaced by a corresponding quantity of barium oxide (BaO) or strontium oxide (SrO) or a mixture of these two or of either or both of these with CaO.

Having thus disclosed the invention, what is claimed is:

1. A nickel oxide catalyst which consists essentially of (a) a support selected from the group consisting of alumina support and silica-alumina support wherein the alumina content of said support is in the form of the aluminate of an oxide selected from the group consisting of calcium oxide, strontium oxide, and barium oxide, said aluminate being the product of the solid state reaction of alumina, at a temperature of 950–1400° C., and said oxide; and (b) nickel oxide.

2. A process for producing a nickel supported catalyst which comprises reacting the alumina in a catalyst support selected from the group consisting of alumina and silica-alumina with a metal oxide selected from the group consisting of calcium oxide, strontium oxide and barium oxide to form the corresponding aluminate, the reaction being effected in the solid state at a temperature of between 950–1400° C., and impregnating the resulting support with a nickel catalyst.

References Cited by the Examiner

UNITED STATES PATENTS

| | | | |
|---|---|---|---|
| 2,442,191 | 5/48 | Black | 252—455 |
| 2,834,738 | 5/58 | Vincent | 252—455 X |
| 2,958,647 | 11/60 | Hirschler | 252—457 X |
| 2,964,481 | 12/60 | Cramer et al. | 252—455 |
| 3,065,284 | 11/62 | Geerts | 252—455 X |

MAURICE A. BRINDISI, *Primary Examiner.*